No. 707,149. Patented Aug. 19, 1902.
A. R. MOORE.
BRAKE.
(Application filed Mar. 19, 1902.)
(No Model.)
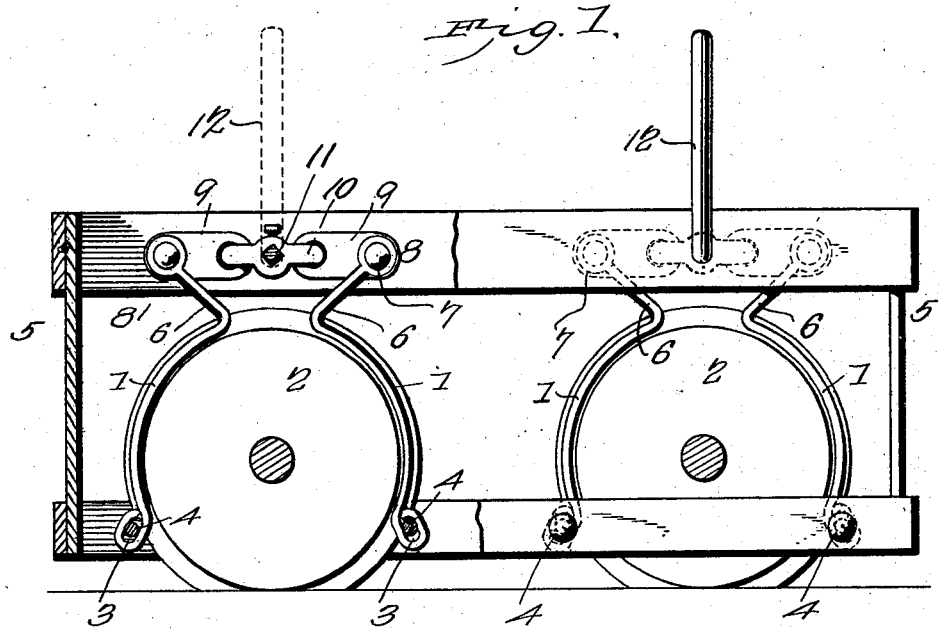
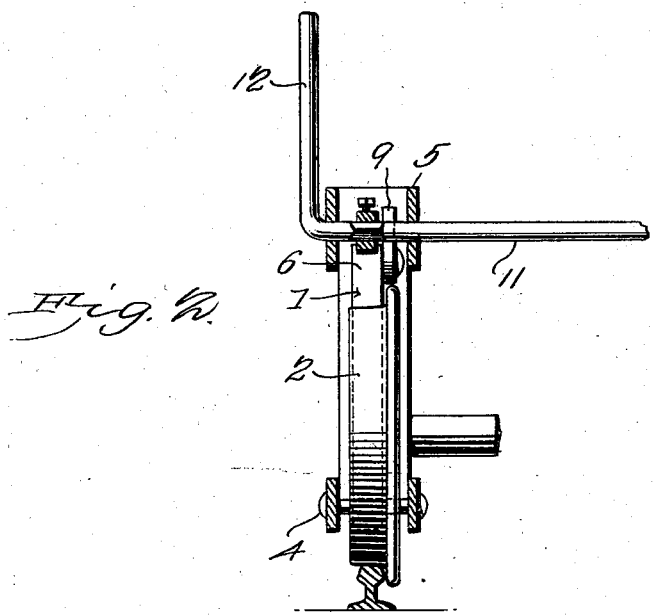
Witnesses
A. R. Moore, Inventor.
by C. A. Snow & Co.
Attorneys

UNITED STATES PATENT OFFICE.

ANDREW R. MOORE, OF CHARLOTTE, MICHIGAN, ASSIGNOR OF ONE-HALF TO LYMAN H. McCALL, OF CHARLOTTE, MICHIGAN.

BRAKE.

SPECIFICATION forming part of Letters Patent No. 707,149, dated August 19, 1902.

Application filed March 19, 1902. Serial No. 99,009. (No model.)

*To all whom it may concern:*

Be it known that I, ANDREW R. MOORE, a citizen of the United States, residing at Charlotte, in the county of Eaton and State of Michigan, have invented a new and useful Brake, of which the following is a specification.

The invention relates to improvements in brakes.

The object of the present invention is to improve the construction of brakes and to provide a simple and comparatively inexpensive one designed for use on cars, hoisting mechanism, elevators, and various other kinds of devices and machines where it is desirable to stop the machine or reduce the speed quickly and adapted to be readily operated by hand, steam, compressed air, or the like and capable of firmly gripping a wheel throughout the major portion of its periphery.

A further object of the invention is to provide a brake of this character which will be adapted to be readily thrown off the wheels and which will be capable of readily taking up any wear of the parts, so that it will remain effective until the shoes are entirely worn out.

The invention consists in the construction and novel combination and arrangement of parts hereinafter fully described, illustrated in the accompanying drawings, and pointed out in the claims hereto appended.

In the drawings, Figure 1 is a side elevation, partly in section, of a portion of a car-truck provided with brakes constructed in accordance with this invention. Fig. 2 is a transverse sectional view of the same.

Like numerals of reference designate corresponding parts in both figures of the drawings.

1 1 designate brake-shoes consisting of curved bars extending from the top of a wheel 2 within a short distance of each other to points adjacent to the bottom of the wheel in order to embrace the major portion of the tread or periphery thereof, and the said brake-shoes are provided at their lower ends with loops 3, diverging downwardly or outwardly from the curved engaging portions of the bars or shoes 1 and receiving fastening devices 4, which connect the brake bars or shoes with the lower portion of a frame 5, which may be applied to or constitute a portion of a truck-frame and which may be constructed in any desired manner. The brake is shown in the accompanying drawings arranged to operate on car-wheels; but instead of being used as a car-brake it may be advantageously employed on all kinds of machines and devices where it is necessary to rapidly reduce speed or make a quick stop.

The upper portions of the curved brake bars or shoes are provided with diverging outwardly or upwardly extending arms 6, terminating in eyes 7, which receive fastening devices 8 for connecting the brake shoes or bars with the outer ends of links 9. The links 9 are arranged horizontally when the brake-shoes are off the wheels, and they extend inward from the arms 6 and are connected to arms 10 of a rock-shaft 11. The rock-shaft 11 is journaled in suitable bearings and is designed to extend entirely across the car-track in order to operate the brake-shoes of both wheels of an axle, and it is provided with an operating-arm 12, forming a lever and adapted to be arranged vertically, as shown in Fig. 1, or in a horizontal or other position. The arm 12 is arranged in an upright position, as shown in Fig. 1, when the brake shoes or bars are out of engagement with the wheel, and it is adapted to be operated by hand, steam, compressed air, or any other power, and when it is swung in either direction from a vertical position the links will be drawn inward by the arms of the rock-shaft, thereby moving the brake shoes or bars upward and inward. One of the arms of the rock-shaft swings downward and inward, and the other is moved upward and inward, and the diverging loops 3 of the pivoted lower ends of the brake-shoes form guides for directing the brake shoes or bars inward to cause the same to hug the wheel when the brake is applied. When the brake shoes or bars are moved downward, they are also carried outward by the diverging loops or guides 3. This construction and arrangement of guides also enables the brake-shoes to take up any wear of the parts, so that the curved brake bars or shoes will remain effective until worn out.

It will be seen that the brake is exceedingly simple and inexpensive in construction, that the brake-shoes engage the wheel throughout the major portion of the periphery or tread of the same, and that the short arms of the rock-shafts form with the upwardly-extending arm or handle a powerful lever for holding the brake-shoes against a wheel. It will also be seen that any desired power may be obtained in this manner and that the brake may be operated by hand, steam, compressed air, or any other desired power.

What I claim is—

1. A brake comprising curved bars or shoes provided at one end with divergent guides arranged to carry the shoes inward and outward when the same are moved longitudinally, said bars or shoes being provided at their other ends with arms and designed to extend over the major portion of the periphery of the wheel to be engaged, and operating mechanism connected with the arms and adapted to move the brake shoes or bars both inward and outward and longitudinally, substantially as described.

2. A brake comprising curved bars or shoes, outwardly-divergent guides arranged at one end of the bars or shoes and adapted to move the same inward and outward when the said bars or shoes are moved longitudinally, and operating mechanism connected with the other ends of the bars or shoes and adapted to move the same longitudinally and inward and outward, substantially as described.

3. A brake comprising curved bars or shoes provided at one end with divergent loops and having divergent arms at the other end, fastening devices passing through the loops, links connected with the arms, and a lever provided with arms connected with the links, substantially as described.

4. A brake comprising curved brake bars or shoes provided at one end with divergent loops and having divergent arms at the other end, fastening devices passing through the loops, a rock-shaft provided with arms, and links connecting the arms of the rock-shaft with the arms of the brake-shoes, substantially as described.

In testimony that I claim the foregoing as my own I have hereto affixed my signature in the presence of two witnesses.

ANDREW R. MOORE.

Witnesses:
CARROLL S. BROWN,
EDMUND S. TRACY.